United States Patent [19]
Okano

[11] 4,268,745
[45] May 19, 1981

[54] TRACKING SERVO DRAWING DEVICE IN OPTICAL TYPE INFORMATION READING DEVICE

[75] Inventor: Takashi Okano, Tokorozawa, Japan

[73] Assignee: Universal Pioneer Corporation, Tokyo, Japan

[21] Appl. No.: 64,704

[22] Filed: Aug. 8, 1979

[30] Foreign Application Priority Data

Sep. 9, 1978 [JP] Japan .................... 53/111086

[51] Int. Cl.³ .................................. G01J 1/36
[52] U.S. Cl. ............................ 369/44; 250/204
[58] Field of Search ............. 179/100.3 J, 100.3 G, 179/100.1 G; 250/201, 204, 570

[56] References Cited
U.S. PATENT DOCUMENTS

| | | | |
|---|---|---|---|
| 4,059,841 | 11/1977 | Bricot et al. | 250/201 |
| 4,097,730 | 6/1978 | Korpel | 250/204 |
| 4,160,270 | 7/1979 | Goldschmidt et al. | 179/100.1 G |
| 4,165,519 | 8/1979 | Goto | 179/100.3 V |

Primary Examiner—David C. Nelms
Attorney, Agent, or Firm—Sughrue, Rothwell, Mion, Zinn and Macpeak

[57] ABSTRACT

A tracking servo drawing device in an optical type information reading device utilizes a tracking servo to allow an irradiation light beam to track a record track on an information record surface to read information by using said irradiation light beam illuminating said record surface. A speed detection circuit is used to sense a relative speed of the record track and the irradiation light beam at which the irradiation light beam goes across the video track. When the relative speed is lower than predetermined value, a first detection signal is produced. A signal level detection circuit detects the reproduction signal level of the information. When the level reaches a predetermined value, a second detection signal is produced. When the first and second detection signals are produced simultaneously an instruction signal is generated to close the servo loop of said tracking servo means.

7 Claims, 10 Drawing Figures

TRACKING SERVO DRAWING DEVICE IN OPTICAL TYPE INFORMATION READING DEVICE

BACKGROUND OF THE INVENTION

This invention relates to an irradiation light beam tracking servo drawing device for an optical type information reading device.

In an optical type video disk, recesses called "pits" are arranged on the surface thereof to form concentric tracks or a spiral track. Video information is recorded by the lengths and intervals of these pits.

In reading information out of the video disk, a light beam is applied to the video track comprising these pits, and th reflection light beam modulated by the presence or absence of the pits is demodulated. The information reading device of such an information recording disk is provided with a so-caled "tracking servo device" so that the irradiation light beam is correctly applied to the video track at all times.

FIG. 1 is an explanatory diagram showing the outline of one example of a tracking servo device. A light beam from a light source 1 such as helium neon laser is passed through a collimeter lens 2, a beam splitter 3, λ/4 plate 4, a tangential mirror 5, a tracking mirror 6 and a focus lens 7, to be focused on the record surface of a video disk 8. The reflection light beam is applied through the focus lens 7, the tracking mirror 6 and the tangential mirror 5 to the λ/4 plate 4 and the beam splitter 3, where the incident light beam and the reflection light beam which has read the information are effectively separated.

The reflection light beam separated by the beam splitter 3 is applied to another beam splitter 11, where it is separated into a light beam for servo operation and a signal reproducing light beam. The signal reproducing light beam is detected by a light receiving element (not shown) and it is suitably processed to be reproduced as a signal. On the other hand, the light beam for servo operation is applied through a cylindrical lens 12 to the light receiving surface of a light receiving element 9 provided following the lens 12 in the light path.

The light receiving element 9 is designed to produce a tracking servo signal adapted to control the rotation of the tracking mirror 6 and a focus servo signal which is employed so that the vertical movement of the focus lens 7 is controlled with respect to the disk 8. Hence, the irradiation light beam is focused on the record surface at all times. More specifically, as shown in FIG. 2, the light receiving element 9 is made up of four light receiving units 9a, 9b, 9c and 9d. The light beam passing through the cylindrical lens 12 is focused on the two focal lines being in the plane including the generating lines of the cylindrical lens and in the plane perpendicular to the aforementioned plane.

By utilizing the principle, the configuration changes of the beam spot projected onto the four separate light receiving units of the light receiving element 9 are detected and measured to determine the positional relation between the focus lens 7 and the record surface. This is used to control the vertical movement of the lens 7, that is, the focus servo operation is carried out.

In the tracking servo operation, the sums of the outputs of the adjacent light receiving units 9a and 9d, and 9b and 9c, i.e. the sums (Va+Vd) and (Vb+Vc) are applied to a comparison amplifier 10, and the difference voltage Ve is used as an error signal for tracking servo.

When the center of the irradiation light beam is set on the center line of the video track by suitably setting the relation between the cylindrical lens 12, the light receiving element 9 and the video track, then the images of the pits are projected onto the light receiving surfaces as indicated by reference numeral 20 in FIG. 3(a). When the center of the irradiation light beam is shifted from the center line of the video track, then the images of the pits are projected onto the light receiving surfaces as indicated by reference numeral 20 in FIG. 3(b). That is, the output Ve of the comparison amplifier 10 is an error signal corresponding to a distance between the center of the light beam and the track center line. The tracking mirror 6 is turned by a necessary angle through using the error signal, so that the light beam is correctly on the track at all times.

The tangential mirror 5 is used to control the position of the light beam in the tangential direction of the video disk, and serves as a time base corrector. The detailed description of the tangential mirror 5 will be omitted since its function and construction are well known in the art.

Although the video tracks of the video disk are provided substantially concentric in general the center of those concentric circles is not coincident with the center of rotation of the video disk which is obtained when it is rotated on a reproducing device. Therefore, when the tracking servo loop is open, the reading irradiaton light beam spot goes obliquely across the tracks Y as indicated by the arrow X in FIG. 4(a). If, under this condition, the tracking servo loop is closed, the tracking mirror immediately carries out an abrupt operation to follow the track. This is especially true when the relative speed between the irradiation light beam and the track is high. Then, the tracking mirror causes the light beam to pass over the track. Thus, the mirror is vibrated until the servo is completely locked, and in a worst case it is impossible to lock the servo.

SUMMARY OF THE INVENTION

Accordingly, an object of the invention is to provide a tracking servo drawing device which can stably close a servo loop at the start of tracking servo in an optical type informaton reading device as described above.

The tracking servo drawing device according to the invention utilizes the eccentric state where the center of a video track is not coincident with the center of rotation of the video disk. Because of this eccentricity, the relative speed between the video track and the irradiation light beam at which the irradiation light beam goes across the video track changes sinusoidally during one revolution of the disk. From this fact the minimum value of the relative speed or a value around the mininum value is detected. On the other hand, the level of the reproduction signal, which is produced when the light beam passes the track, is detected, so that the servo loop is cloed when the speed is low and the reproduction signal level is high.

This means that the servo is closed when the relative speed is low and the irradiation light beam is on the track. Therefore, a stable servo operation can be carried out.

The invention will be described with reference to the accompanying drawings and the preferred embodiment thereof.

BRIEF DESCRIPTION OF THE DRAWINGS

FIG. 3 shows images of pits projected onto a light receiving element. More specifically.

DESCRIPTION OF THE PREFERRED EMBODIMENT

Figure 4:
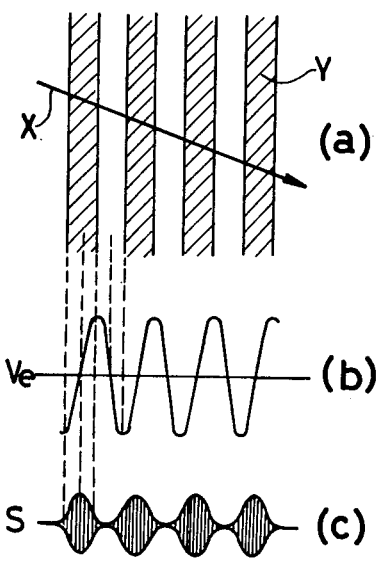
FIG. 4(a), (b) and (c) indicates the relation between the light beam spot and the track, an error signal waveform and a reproduction signal, respectively, when a tracking servo loop is open.
Figure 5:
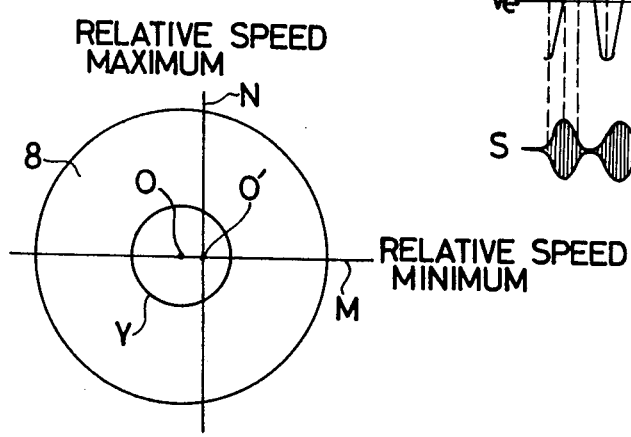
FIG. 5 is an explanatory diagram for a description of the relative speed of the track and the spot obtained when the center of the track is shifted from the center of rotation of the disk.

FIG. 4(a) shows the relation between the irradiation spot and the track when the tracking servo loop is open, the corresponding error signal Ve waveform, FIG. 4(b), and the corresponding reproduction signal S waveform FIG. 4(c). Referring to FIG. 5, in general, the center O' of a video disk 8 is shifted from the center O of the video track Y. Accordingly, the relative speed of the track and the spot is a minimum on a line M connecting the center O of the track and the center O' of rotation. In contrast, the relative speed is a maximum on a line N which passes through the center O' of rotation and is perpendicular to the line M. Therefore, between the lines M and N the relative speed gradually changes. Thus, it can be understood that the relative speed changes sinusoidally with one revolution of the disk 8 as one cycle.

Figure 1:
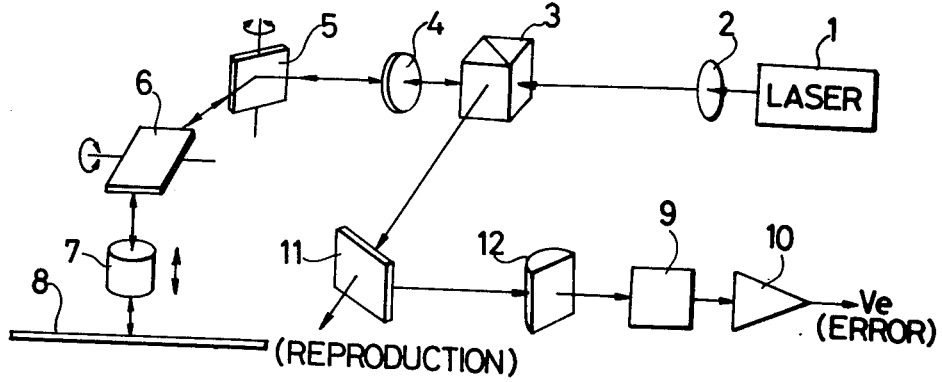
FIG. 1 is an explanatory diagram showing one example of a tracking servo device.
Figure 2:
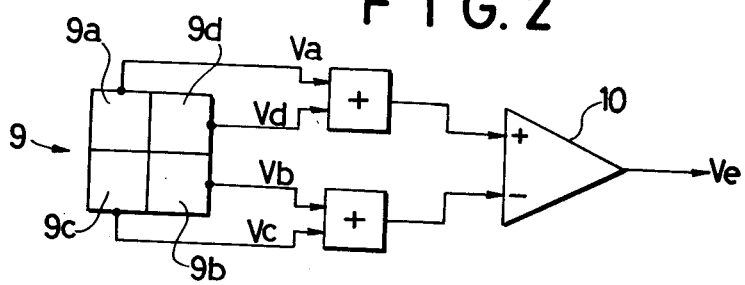
FIG. 2 is a diagram showing a tracking error signal generating circuit.
Figure 3A:
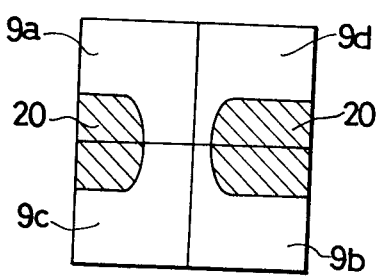
FIG. 3(a) shows the case where a light beam spot coincides with the center line of a track.
Figure 3B:
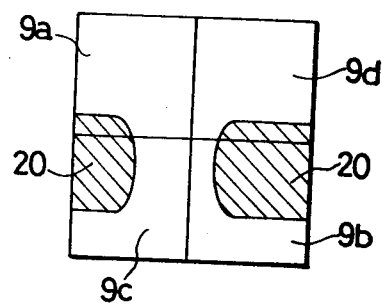
FIG. 3(b) shows the case where the light beam spot is somewhat shifted from the center line of the track.
Figure 6:
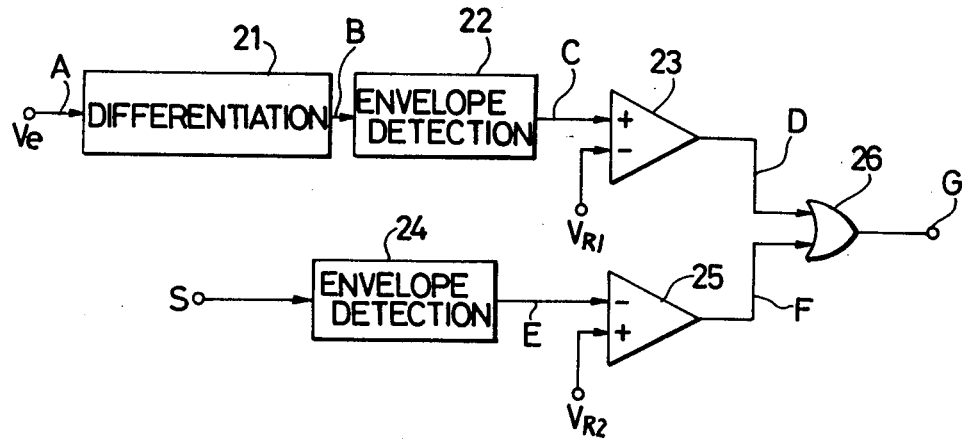
FIG. 6 is a block diagram of one example of a tracking servo device according to this invention.

Based on these facts, a block diagram of one example of the tracking servo drawing device according to the invention is obtained as shown in FIG. 6. In FIG. 6, a differentiation circuit 21 is provided which receives an input signal A which is the error signal Ve of the comparison amplifier 10 (FIGS. 1 and 2). The output B of the differentiation circuit 21 is applied to a detection circuit 22 which carries out envelope detection, to obtain an envelope signal C. The envelope signal C is applied to a comparator 23, where it is compared with a reference voltage $V_{R1}$. When the signal C is higher than the reference voltage $V_{R1}$, the comparator 23 outputs a high level detection signal D. When the signal C is lower than the reference voltage, the comparator outputs a low level detection signal D.

On the other hand, the reproduction signal S shown in FIG. 4(c) is applied to an envelope detection circuit 24, the output of which (E) is compared with a reference voltage $V_{R2}$ in a second comparator 25. The comparator 25 outputs a detection signal F which has a low level voltage when the signal E is higher than the reference voltage $V_{R2}$ and a high level when the signal E is lower than the reference voltage $V_{R2}$. The two signals, D and F are applied to an OR gate 26, the output of which is an instruction signal to close the servo loop.

Figure 7:
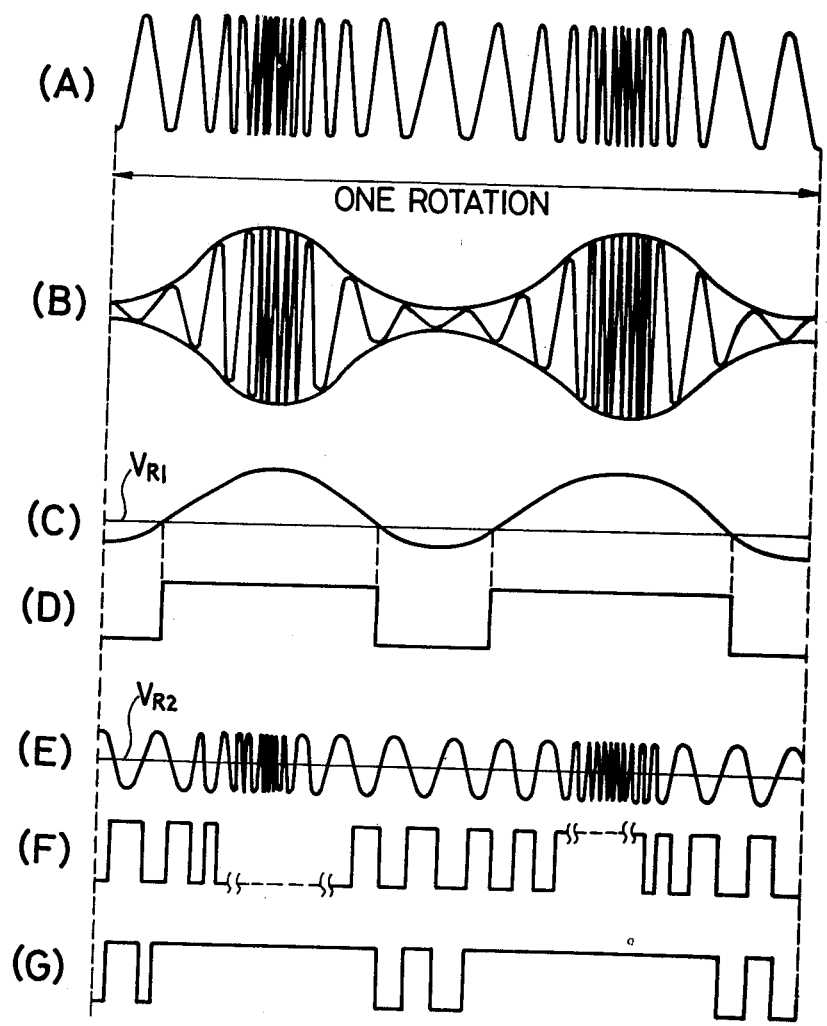
FIG. 7 is a waveform diagram showing various signals in the circuit in FIG. 6.

FIG. 7 shows waveforms at various parts in FIG. 6. The reference characters of these waveforms are identical to those designating the various signals in FIG. 6. As is apparent from FIG. 7 and the description made with reference to FIG. 5, the tracking error signal Ve has a waveform as designated by the reference character A in FIG. 7 when the servo loop is open. Accordingly, the differentiation output of the differentiation circuit 21 is as indicated by the reference character B in FIG. 7. As a result, the output of the envelope detection circuit 22 is as indicated by the reference character C in FIG. 7. Thus, the low level signal of the output D of the comparator 23 shows the fact that the relative speed is low.

On the other hand, the low level signal of the comparison output F obtained from the envelope detection output E of the reproduction signal S and the reference voltage $V_{R2}$ indicates the fact that the spot is on the track. Thus, the fact that the two low level signals D and F are simultaneously outputted is detected by the OR gate 26, to close the servo loop. That is, the tracking servo can start its stable operation by drawing the servo loop in response to the low level output signal G of the OR gate 26. As shown in FIG. 7(g), the generation of a high level signal, either D or F will result in an OR high level output.

The invention has been described with reference to its preferred embodiment; however, it should be noted that the invention is not limited thereto or thereby. That is, it is obvious that those skilled in the art can utilize modifications and changes without departing from the invention.

What is claimed is:

1. In a tracking servo drawing device in an optical type informaton reading device having tracking servo means for allowing an irradiation light beam to track a recorded track on an information record surface to read information by using said irradiation light beam to illuminate said record surface, the improvement comprising; speed detection means for detecting a relative speed of said record track and said irradiation light beam at which the irradiation light beam goes across the video track, and when said relative speed is lower than a predetermined value; producing a first detection signal; signal level detection means in which the reproduction signal level of said information is detected, and when said reproduction level reaches a predetermined value, a second detection signal is produced; and, means responsive to the simultaneous generation of said first and second detection signals to generate an instruction signal to close the servo loop of said tracking servo means.

2. A device as claimed in claim 1, wherein said speed detection means comprises: means for sensing shifting of said irradiation light beam from the center of said track, and generating an error signal corresponding to the distance between said irradiation light beam and said center of said track; a differentiation circuit for subjecting said error signal to differentiation; detection means for subjecting the differentiation output of said differentiation circuit to envelope detection; and means for outputting said first detection signal when the envelope detection output of said detection means is at a predetermined level or less.

3. The device as in claims 1 or 2 wherein said signal level detection means comprises an envelope detection circuit receiving the reproduction signal and comparator means comparing the output of said envelope detection circuit with a predetermined signal value and generating said second detection signal.

4. The device as in claim 2 wherein said means for sensing shifting of said irradiation light beam and generating an error signal comprises a light receiving element having light receiving surfaces, and a comparator for comparing said position signals and generating said error signal.

5. The device as in claim 4 wherein said means for sensing shifting of said irradiation light beam and generating an error signal further comprises summing means for selectively combining the outputs of said light receiving surfaces into position signals.

6. The device as in claim 5 wherein said light receiving element has four light receiving surfaces arranged in a symmetrical pattern and said summing means comprises two summers to combine signals from two adjacent surfaces, respectively.

7. The device as in claim 1 wherein means responsive to the simultaneous generation of said first and second detection signals comprises an OR gate.

* * * * *